United States Patent [19]

Papuchon

[11] 4,196,964
[45] Apr. 8, 1980

[54] OPTICAL WAVEGUIDE SYSTEM FOR ELECTRICALLY CONTROLLING THE TRANSMISSION OF OPTICAL RADIATION

[75] Inventor: Michel Papuchon, Paris, France
[73] Assignee: Thomson-CSF, Paris, France
[21] Appl. No.: 872,555
[22] Filed: Jan. 26, 1978
[30] Foreign Application Priority Data
Jan. 31, 1977 [FR] France ............... 77 02598
[51] Int. Cl.² .................................. G02B 5/14
[52] U.S. Cl. .................................. 350/96.14
[58] Field of Search ........................ 350/96.14
[56] References Cited
U.S. PATENT DOCUMENTS

| | | |
|---|---|---|
| 3,795,433 | 3/1974 | Channin ............ 350/96.14 |
| 3,883,220 | 5/1975 | Taylor ............ 350/96.14 |
| 3,920,314 | 11/1975 | Yajima ............ 350/96.14 |
| 4,008,947 | 2/1977 | Baues et al. ............ 350/96.14 |
| 4,070,094 | 1/1978 | Martin ............ 350/96.14 |
| 4,128,300 | 12/1978 | Stotts et al. ............ 350/96.14 |

Primary Examiner—Stewart J. Levy
Attorney, Agent, or Firm—Cushman, Darby & Cushman

[57] ABSTRACT

The system according to the invention comprises at least one input and two output monomode waveguide branches connected to the input and the output of a multimode guide section. The input branch excites a combination of propagation modes in the multimode guide. This combination gives rise to energy distributions across the width of the multimode guide which are variable with the intensity of an electrical field.

13 Claims, 14 Drawing Figures

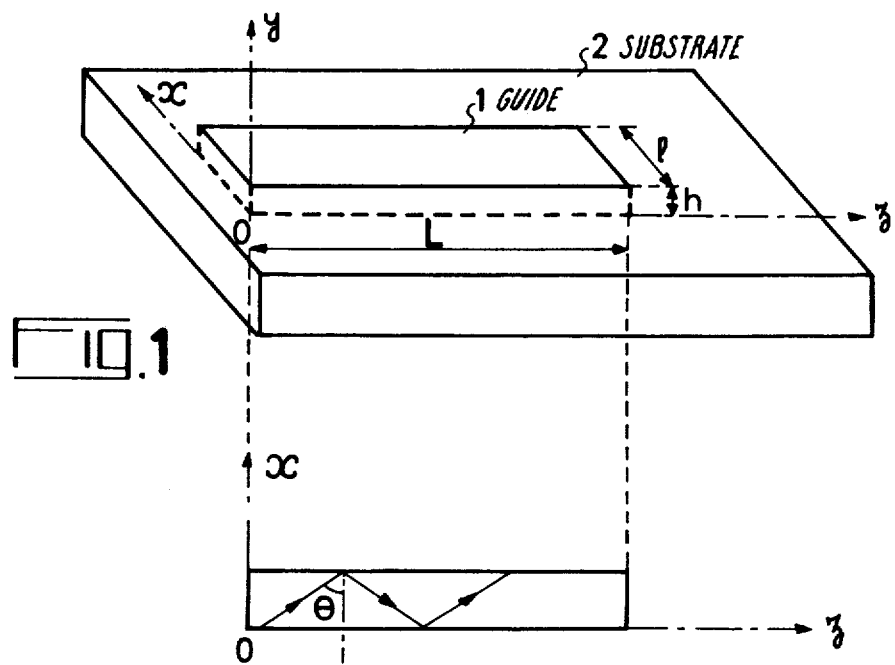
Fig. 1
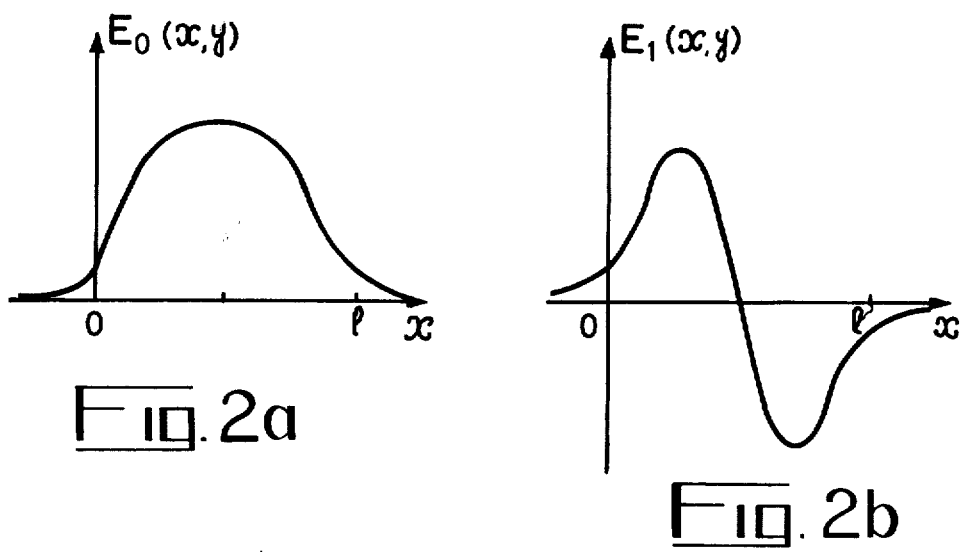
Fig. 2a
Fig. 2b

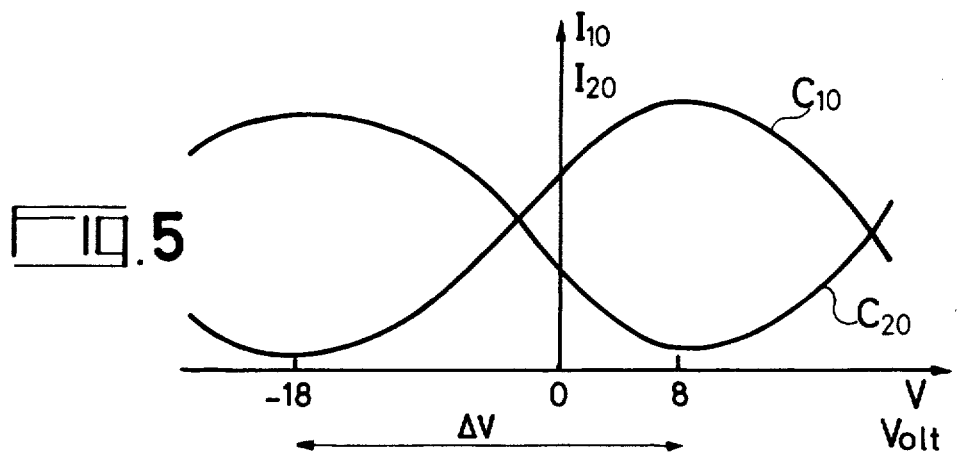
Fig.5
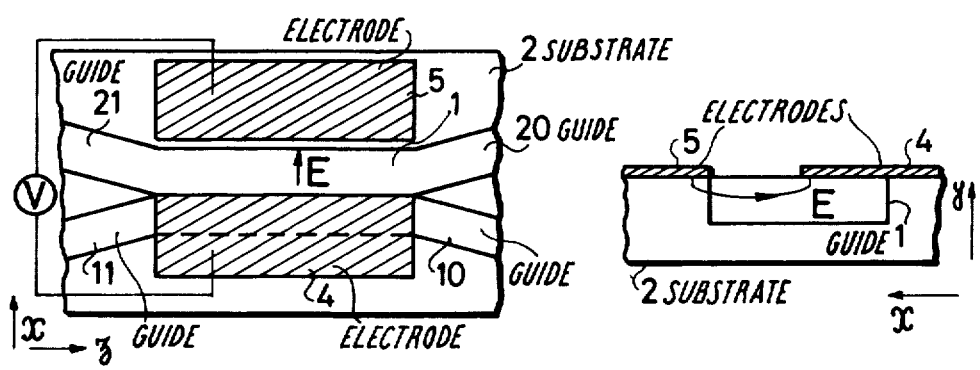
Fig.6a
Fig.6b
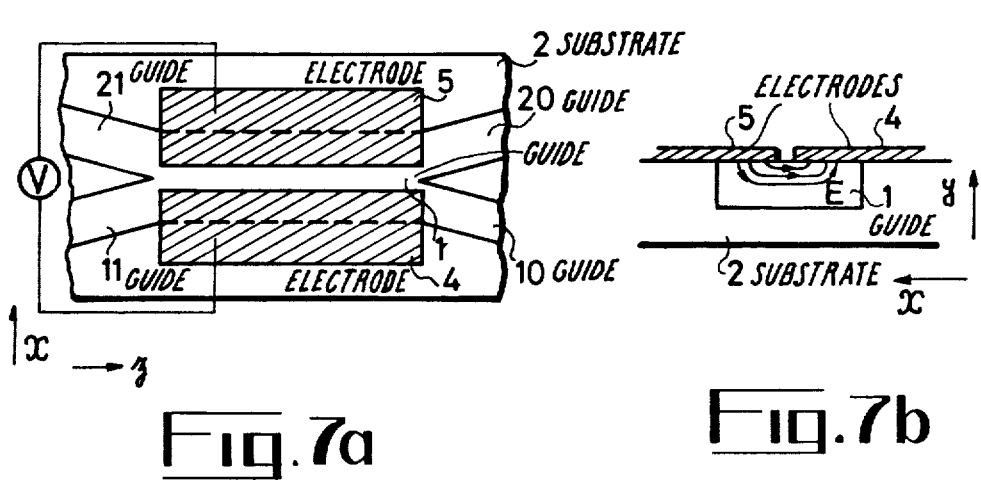
Fig.7a
Fig.7b

OPTICAL WAVEGUIDE SYSTEM FOR ELECTRICALLY CONTROLLING THE TRANSMISSION OF OPTICAL RADIATION

This invention relates to optical waveguide systems which can be produced in particular in the form of integrated optical structures. An integrated guide is formed by creating in a substrate of refractive index $n_o$ a zone in which the refractive index $n_1$ is greater than $n_o$. The advantage of integrated optical structures is that they do not require any alignment and do not give rise to any stability problems. In order to guide optical radiations in several directions, it is of advantage to be able to switch these radiations from one guide to another.

It is known that electro-optical switches can be produced by using the principle of the directional coupler, i.e. a device comprising two wave guides made of an electro-optical material and separated by a medium having a lower refractive index than the electro-optical material by a distance of about a few microns so that the radiation can be transferred from one guide to the other. The refractive index of the two guides is modified in opposite ways by the action of an electrical field. Thus, the coupling length and hence the portion of luminous energy which passes from the first guide to the second guide are modified. Structures such as these have to be geometrically very precise because the coupling length is critically dependent upon a large number of parameters. In particular, the inter-guide distance has to be very precise.

There are also structures comprising a single monomode guide in which an anisotropy of the refractive index is created by a set of three electrodes of which one—very thin—is arranged parallel to the axis of the guide. This anisotropy leads to different energy values in the two halves of the guide.

In accordance with the present invention, there is provided an optical waveguide system for electrically controlling the transmission of optical radiation of wavelength $\lambda$ between monomode input and output optical waveguide branches, said system comprising on the surface of a substrate at least one input and a first and a second output branches, an intermediate multimode waveguide section having an input connected to said input branch and an output connected to said output branches, said input branch exciting a combination of propagation modes in said waveguide section; said system further comprising electrical means creating controlled variations in the velocities of said propagation modes, in order to vary the energy distribution across the width of said waveguide section.

For a better understanding of the present invention, and to show how the same may be carried into effect, reference will be made to the ensuing description and the following drawings among which:

FIG. 1 shows a rectangular optical guide;

FIGS. 2a and 2b show the energy configuration over the width of the guide for the first two modes;

FIG. 5 shows the variations in the energy recuperated in each output branch in dependence upon the electrical control voltage;

FIGS. 6a, 6b, 7a and 7b show modified embodiments of the invention;

FIG. 1 shows a rectangular guide 1 supported by a substrate 2 of refractive index $n_o$. The refractive index in the guide $n_1$ is greater than $n_o$. The upper surface of the guide is in contact with the external medium of refractive index $n_2$. There is given a reference system Oxyz. An optical radiation of wavelength $\lambda$ is propagated through the guide 1 in the direction z because of the total reflection of this wave at the plane dioptres by which said guide is delimited. The dimensions of the guide are marked L for the length in the direction z, L being very much greater than $\lambda$; l for the width in the direction x and h for the thickness in the direction y. The reflections of the luminous wave take place in two groups of planes: the planes yz between the base of the guide and the contact surface with the external medium and the planes x y between the lateral walls. The following description will be confined solely to this latter series of reflections in the planes xz. In the interests of simplicity, it will be considered that the guide is monomode in the direction y. If $\theta$ is the angle of incidence of the light, light will only be transmitted on condition that $\theta$ is greater than the limiting angle $\theta_o$ defined by $\sin \theta_o = n_o/n_1$. In addition, the angle $\theta$ must belong to a discrete sequence of angles having decreasing values: $\theta_o, \theta_1 \ldots, \ldots \theta_n$. This sequence is determined by the width l of the guide 1, the wavelength $\lambda$ and the indices $n_o$ and $n_1$. To each angle $\theta_i$ there corresponds a propagation mode i with very few losses propagating with a propagation constant $\beta_i$ in the direction z. $\beta_i$ and $\theta_i$ are connected by the relation $n_1 \sin \theta_i = \beta_i/k$ where k is the wave number of a radiation of wavelength $\lambda$ in vacuo. In the case of a wave polarized along the axis x, the propagation equation giving the electrical field has the form $E = E_i(x, y) \cos \beta_i z$ where $E_i(x, y)$ is a function of x and y.

FIGS. 2a and 2b show as a function of x for constant y the curves representing $E_i(x, y)$ namely the curve $C_o$ for the mode o (FIG. 2a) and the curve $C_1$ for the mode 1 (FIG. 2b). The dimensions of the guide and the values $n_o$, $n_1$ and $\lambda$ are such that the mode 2 cannot be propagated.

Figure 3A:
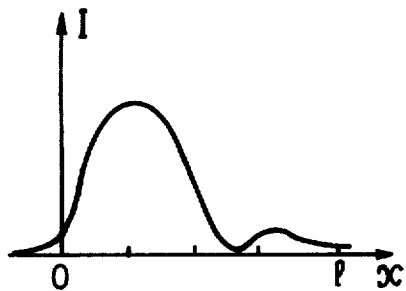
FIGS. 3a, 3b, 3c and 3d show the energy configurations resulting from the interference of the first two modes.
Figure 3B:
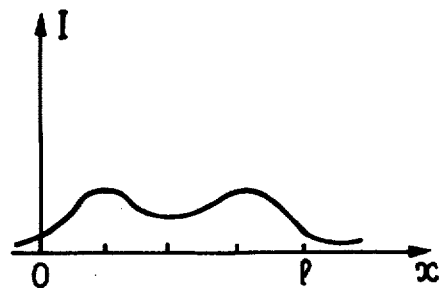
Figure 3C:
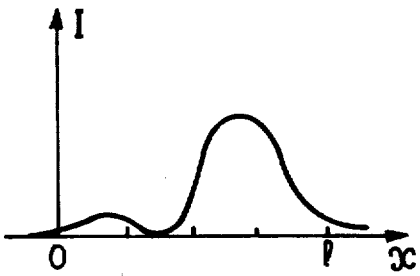
Figure 3D:
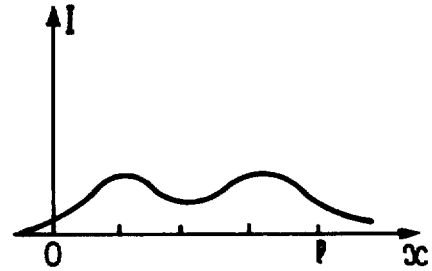

Since the two modes are propagated with different constants $\beta_o$ and $\beta_1$, their phase shift $\phi = (\beta_1 - \beta_o) z$ is not constant. The modes interfere and the distribution of energy in the guide varies in the direction z. FIGS. 3a, 3b, 3c and 3d show different distributions of the luminous energy I as a function of x in the following cases: $\phi = 0$ (FIG. 3a); $0 < \phi < \pi$ (FIG. 3b); $\phi = \pi$ (FIG. 3c); $\pi < \phi < 2\pi$ (FIG. 3d). It can be seen from FIG. 3a that a large part of the energy is concentrated in one half of the guide, whilst in FIG. 3c a large part of the energy is concentrated in the other half of the guide.

Figure 4:
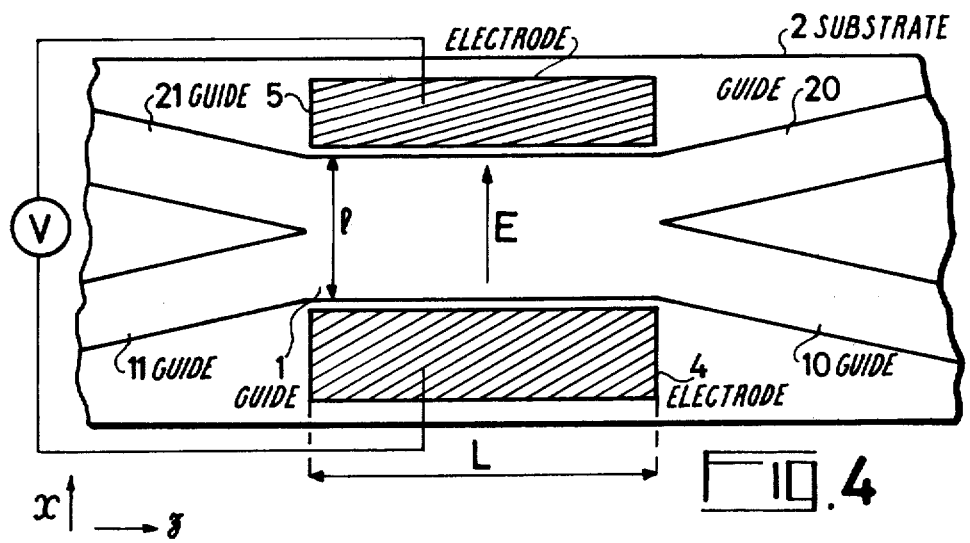
FIG. 4 shows one embodiment of the invention.

FIG. 4 shows one example of embodiment of an optical-guided-transmission system according to the invention. This embodiment comprises two monomode wave guide branches 11 and 10 on the surface of a substrate 2. These two branches are connected by a bimode guide section 1 similar to that described above. They are joined at the ends of the guide 1 so that the guide 11 excites the guide 1 with an optical radiation of which the energy is concentrated in one half of the width 1 of the guide 1. In the guide 1, the radiation divides according to the two propagation modes 0 and 1. The guide 1 is extended by the output branch 10 which recovers the fraction of energy contained in one half of the width of the guide 1 for $z = L$.

On either side of the guide 1 are arranged electrodes 4 and 5 which are separated from the guide 1 by a very narrow thickness and between which a voltage V and hence an electrical field $E = V/l$ is applied. This electrical field creates a variation $\Delta n$ in the index of the guide and hence variations $\beta_o$ and $\beta_1$ in the propagation constants of the two modes. Since these variations have the same sign, but differ in value, the phase shift $\phi$ between the two modes is modified by a value $\Delta\phi = (\Delta\beta_1 - \Delta\beta_o)z$. The luminous energy $I_{10}$ entering the branch 10 depends upon the energy configuration for $z = L$, i.e. upon the phase shift $\phi_L = (\beta_1 - \beta_o)L$. When $\phi_L = 0$, $I_{10}$ is maximal and when $\phi_L = \pi$, $I_{10}$ is minimal.

Another output guide branch 20 is shown in the FIG. 4. By means of this branch, it is possible if desired to recover the fraction of energy $I_{20}$ which is not recovered by the branch 10 and thus to form a two-channel switch.

On the other hand, FIG. 4 shows a branch 21 symmetrical with the branch 11 at the entrance to the guide 1. This branch 21 is useful for the convenience of construction of the system. It is not excited. It may optionally be used in applications of the invention requiring two input channels. Since the structure is symmetrical, it is bilateral, in other words luminous energy can also be made to propagate from one of the branches 10 or 20 towards one of the branches 11 or 21. The described excitation process has two main advantages: since the guide 11 is monomode, excitation is independent of the coupling conditions. On the other hand, the conditions created at the input end (maximum energy in one half of the guide and negligible energy in the other half) are optimal for obtaining at each output good ratio between the maximal energy and the minimal energy.

In one embodiment of the invention, the structure was formed in a substrate of lithium niobate. The various guides are obtained by the diffusion of titanium whereby it is possible to increase the refractive index of the zone where diffusion takes place and hence to form a guide. Gold electrodes are deposited. The production of the structure as a whole involves the use of masking techniques similar to those used for the production of semiconductors. Given a configuration of the electrodes of the type shown in FIG. 4, the orientation of the guide is selected in such a way that the axis C of the lithium niobate is parallel to the axis x and hence to the electrical field created by the two electrodes. This orientation, combined with the polarization of the luminous wave, which is itself parallel to the axis x, leads to a high electro-optical coefficient. The width of the guides 10, 20, 11, 21 is equal to 2 $\mu$m and the width of the guide 1 to 4 $\mu$m. The curves $C_{10}$ and $C_{20}$ of FIG. 5, representing the luminous energies $I_{10}$ and $I_{20}$ as a function of the voltage V, were obtained for a length L of the guide 1 of 3 mm. The values of the ratios between the luminous energies in the branches 10 and 20: $I_{20}/I_{10}$ for $I_{10}$ maximal and $I_{10}/I_{20}$ for $I_{20}$ maximal are, respectively, $-16$ dB and $-18$ dB. To switch the luminous energy from one branch to another, it is necessary to pass from $-18$ V to 8 V, i.e. a voltage difference $\Delta V$ of 26 V.

The described configuration of the electrodes means that the propagation constants of the two modes have to be modified in the same way. In order to reduce the voltages to be applied, it is better to modify only one constant, or to modify the two constants in opposite ways. One possible configuration suitable for this purpose is illustrated in plan view in FIG. 6a and in section in FIG. 6b. This configuration differs from the configuration shown in FIG. 4, in that the electrode 4 covers one half of the guide 1. The orientation of the lithium niobate, the polarization direction of the luminous wave and the direction of the electrical field applied between the two electrodes are not changed, but the electrical field lines E only cover half of the guide so that the value of the variation in the refraction index is $\Delta n$ for one half of the guide and substantially zero for the other half. For the same voltage V and for the same length L, the phase shift $\Delta\phi \times L$ between the two waves is multiplied by 6.

Another configuration is illustrated as a plan view in FIG. 7a and in section in FIG. 7b. The two electrodes 4 and 5 cover the guide 1. The electrical field lines E are shown at in FIG. 7b. It can be seen that, in each half of the guide, the electrical field has a component oriented in the direction y; this component has an opposite polarity in each half so that the variations in index are $+\Delta n$ for one half of the guide and $-\Delta n$ for the other half. For this configuration, it is preferable to select an orientation of the axis C of the lithium niobate in the direction y rather than in the direction x so that this axis is parallel to the component of the electrical field which is parallel to y.

The invention also covers the case where the number of modes which can be propagated in the guide 1 is greater than 2. In this case, the distribution of the luminous energy in one part of the guide 1 along the propagation axis has peaks which are narrower, the larger the number of modes and hence the smaller the ratios $I_{10}/I_{20}$ for $I_{20}$ maximal and $I_{20}/I_{10}$ for $I_{10}$ maximal. Neither is the invention limited to rectilinear elements. The system may also be formed with non-rectangular guides.

The invention applies to the switching of luminous energy between several output branches under the action of an electrical signal. If the electrical voltage V is an a.c. voltage, the switch described above may be used for modulating the luminous energy collected in each of the output guides.

Figure 8:
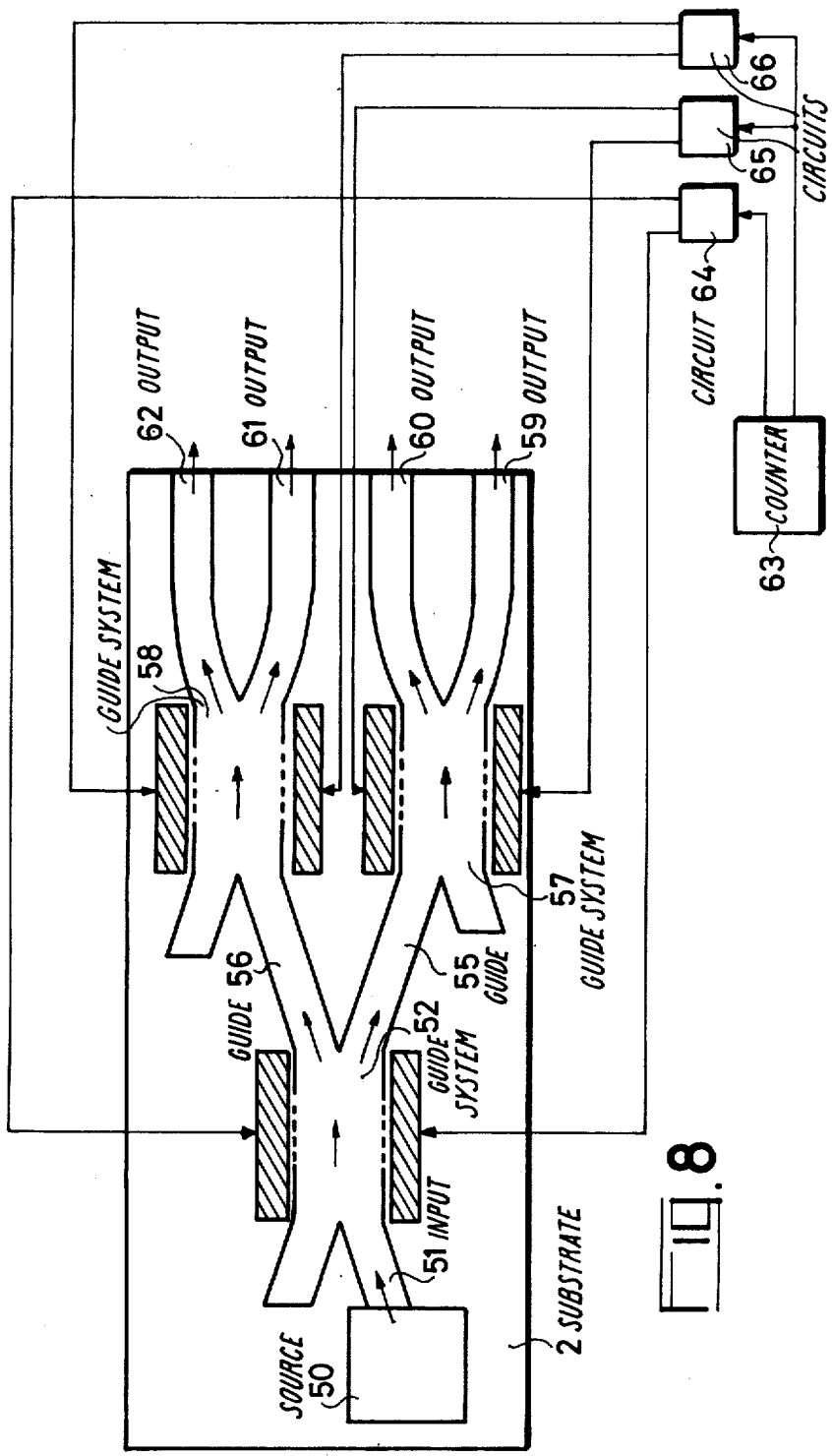
FIG. 8 illustrates one application of the invention.

It is also possible to combine several systems similar to one of those described above with one another in a structure of the arborescent type of which one application is shown in FIG. 8. On a substrate 2, a source of optical radiation 50 excites a branch 51 of a first guide system 52 according to the invention of which the two output branches 55 and 56 are respectively connected to the inputs of second and third similar guide systems 57 and 58 each having two output branches, giving a total of four outputs 59, 60, 61 and 62. The structure as a whole forms a distribution system enabling luminous energy to be directed into one of the output channels under the action of a two-bit binary counter 63. This binary counter is connected to the various electrodes of the systems 52, 57 and 58 by way of shaping circuits 64, 65 and 66 so that the energy is maximal successively in the output channels 59 and 62 and zero in the other three at the rhythm of the frequency of the counter.

The invention is also applicable to the demultiplexing as a function of time of a luminous wave carrying two or more channels by means of a guided-transmission system or a combination of guided-transmission systems according to the invention.

What we claim is:

1. An optical waveguide system for electrically controlling the transmission of optical radiation of wavelength λ between input and output optical waveguide branches, said system comprising:

a substrate having a surface;

on the surface of said substrate at least one monomode input optical waveguide and first and second symmetrical monomode output optical waveguide branches;

an intermediate multimode waveguide section having an input connected to said input branch and an output having two output halves connected to said output branches, said input branch exciting a predetermined combination of propagation modes in said waveguide section;

said output branches for collecting energy localized in said two output halves of said intermediate multimode waveguide section, respectively;

said system further comprising control means for creating an electrical field in said intermediate multimode waveguide section, said field for controlling variations in the respective velocities of said propagation modes, in order to vary the energy distribution across the width of said intermediate multimode waveguide section at said output.

2. A system as claimed in claim 1, wherein said input gives rise to a concentration of energy localized in one half of said waveguide section.

3. A system as claimed in claim 1, wherein said control means comprise two electrodes deposited on said substrate on either side of said waveguide section.

4. A system as claimed in claim 1, wherein said control means comprise two electrodes, one of said electrodes being deposited over a part of the width of said waveguide section, the other one being deposited besides said waveguide section.

5. A system as claimed in claim 1, wherein said control means comprise two electrodes, each recovering one part of the width of said waveguide section.

6. A system as claimed in claim 1, wherein said substrate is made of a ferroelectric material.

7. A system as claimed in claim 6, wherein said ferroelectric material is lithium niobate, the niobium in said niobate being partially replaced by titanium to form said waveguide branches and said waveguide section.

8. A system as claimed in claim 7, wherein the axis c of the lithium niobate is directed parallel to said electrical field.

9. A system as claimed in claim 1, wherein said waveguide branches and said waveguide section have a rectangular form.

10. A system as claimed in claim 2, wherein said waveguide branches and said waveguide section have a rectangular form, the width of each waveguide branch being half of the width of said waveguide section.

11. A system as claimed in claim 1, wherein the number of propagation modes of said waveguide section is equal to 2.

12. A system as claimed in claim 1, further comprising means for absorbing the fraction of energy present in said first output branch and means for receiving the fraction of energy present in said second output branch.

13. A system as claimed in claim 1, further comprising first and second means for respectively receiving the fraction of energy present in said first and second branches.

* * * * *